(12) United States Patent
Frantzen et al.

(10) Patent No.: US 9,810,058 B2
(45) Date of Patent: Nov. 7, 2017

(54) PETROLEUM WELL DOWNHOLE LOGGING TOOL WITH HIGH SPEED DATA BUS

(71) Applicant: BERGEN TECHNOLOGY CENTER AS, Laksevåg (NO)

(72) Inventors: Dag-Håkon Frantzen, Loddefjord (NO); Tarjei Rommetveit, Bergen (NO)

(73) Assignee: BERGEN TECHNOLOGY CENTER AS, Laksevåg (NO)

( * ) Notice: Subject to any disclaimer, the term of this patent is extended or adjusted under 35 U.S.C. 154(b) by 0 days.

(21) Appl. No.: 15/026,868

(22) PCT Filed: Oct. 2, 2013

(86) PCT No.: PCT/NO2013/000047
§ 371 (c)(1),
(2) Date: Apr. 1, 2016

(87) PCT Pub. No.: WO2015/050456
PCT Pub. Date: Apr. 9, 2015

(65) Prior Publication Data
US 2016/0237813 A1 Aug. 18, 2016

(51) Int. Cl.
*G01V 3/00* (2006.01)
*E21B 47/12* (2012.01)
*G01V 11/00* (2006.01)

(52) U.S. Cl.
CPC ............ *E21B 47/124* (2013.01); *E21B 47/12* (2013.01); *G01V 11/002* (2013.01)

(58) Field of Classification Search
CPC ...... E21B 47/124; E21B 47/12; G01V 11/002
(Continued)

(56) References Cited

U.S. PATENT DOCUMENTS 4,255,798 A 3/1981 Havira
4,355,310 A 10/1982 Belaigues et al.
(Continued)

FOREIGN PATENT DOCUMENTS

CN 101691841 A 4/2010
GB 2 406 121 B 12/2005

*Primary Examiner* — Dhaval Patel
(74) *Attorney, Agent, or Firm* — Birch, Stewart, Kolasch & Birch, LLP

(57) ABSTRACT

The invention is a petroleum well downhole logging tool (0) comprising —a wireline telemetry controller unit (6) comprising —a downhole modem (61) for transmitting data at a first bitrate uplink on a wireline (8) to a surface telemetry unit (106) connected to a surface read-out unit (SRO) with a memory (123)), a server toolbus controller (62) connected between said downhole modem (61) and an internal tool databus (7) operating at a second bitrate (r2) higher than the first bitrate; —one or more logging tools (4) each with sensors (40a, 40b, 40c, ... ), each with a client toolbus controller (42) connected on said tool databus (7), said downhole logging tool (0) further comprising —a memory tool unit (2) with a memory section (21) with relatively high IO speed and capacity and connected to said internal tool databus (7) via a memory tool client toolbus controller (42m) connected to said tool databus (7) and arranged for communicating with said server toolbus controller (62), said memory tool (2) further provided with —an internal local high speed data bus (3) operating at a third bitrate (r3) higher than said second bitrate (r2), to —a high-resolution logging tool (1) with one or more sensors (1s) which provides high-resolution data (11), —said memory tool (2) arranged for transmitting a part (11s) of said high-resolution data (11) via said internal tool databus (7) online to said server toolbus controller (62) during logging, and —for uploading more of or all of said high-resolution data (11) via said server toolbus
(Continued)

Figure 1:
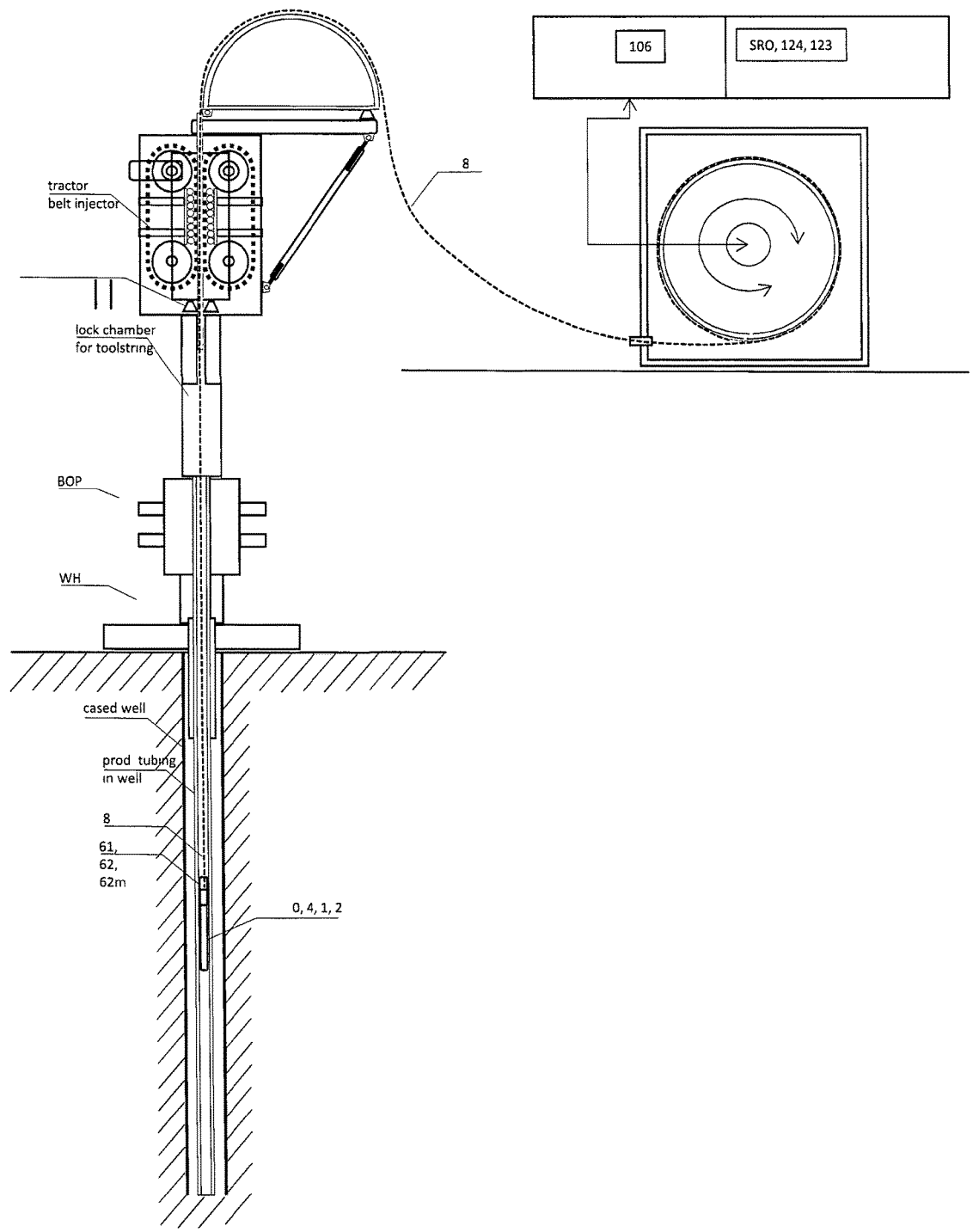

logging string (0) in a well carried on a wireline or fibre composite cable controller (62) to said surface telemetry unit (106) and said surface read-out unit (SRO).

22 Claims, 6 Drawing Sheets

(58) Field of Classification Search
 USPC ......... 340/853.9, 853.2, 853.7, 854.4, 854.7, 340/854.3, 855.3; 702/6, 7, 8; 175/59, 175/61
 See application file for complete search history.

(56) References Cited

U.S. PATENT DOCUMENTS

| | | |
|---|---|---|
| 5,640,371 A | 6/1997 | Schmidt et al. |
| 5,663,559 A | 9/1997 | Auzerais et al. |
| 2003/0164706 A1 | 9/2003 | Iwanicki et al. |
| 2006/0015257 A1 | 1/2006 | Hassan et al. |
| 2010/0095757 A1 | 4/2010 | Hansen |
| 2011/0050452 A1 | 3/2011 | Kusuma et al. |
| 2014/0265565 A1* | 9/2014 | Cooley ............... H02P 6/18 307/18 |
| 2014/0292530 A1* | 10/2014 | Weerasinghe ........ E21B 47/122 340/854.7 |

* cited by examiner logging string (0) in a well carried on a wireline or fibre composite cable With communication to surface via signal cable Without communication to surface

*Logging tool with communication to surface via signal cable and with two or more high data volu producing tools each connected to a memory tool.*

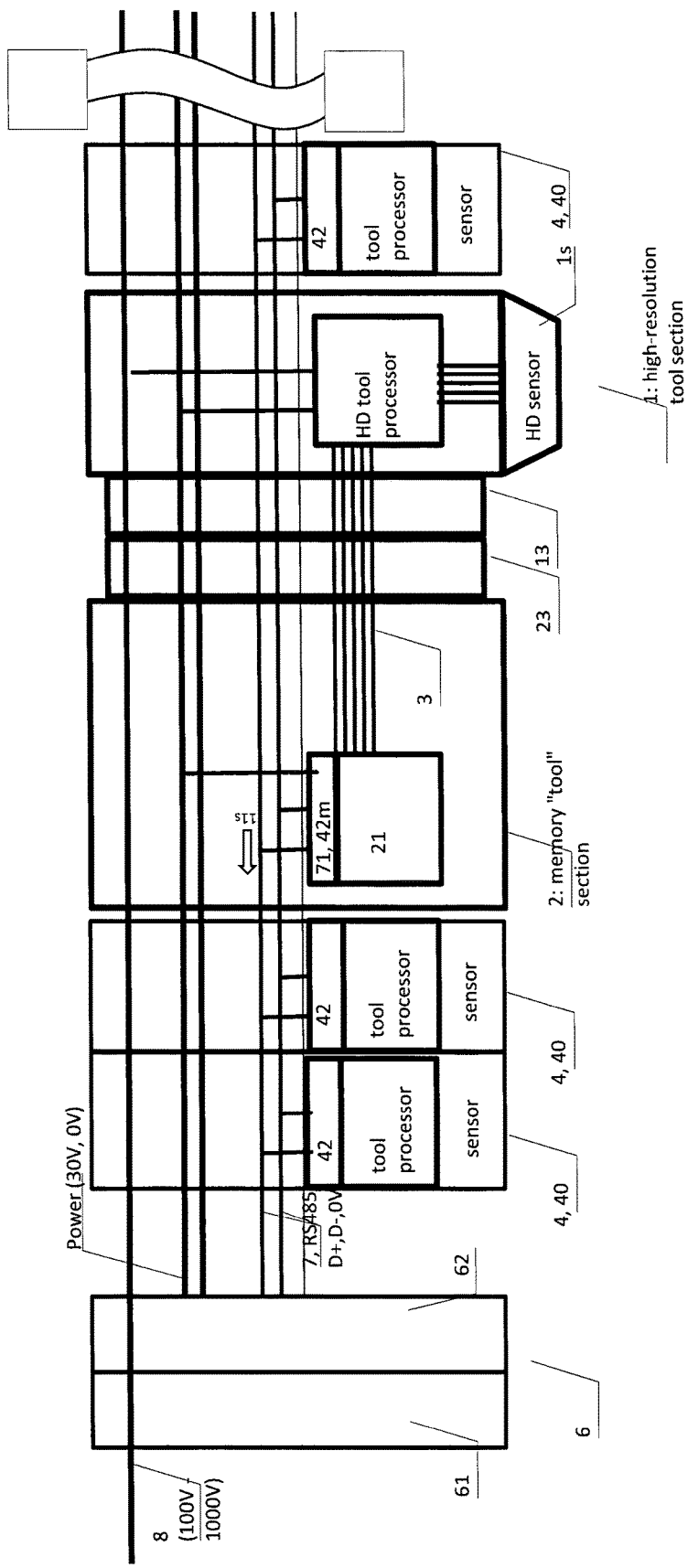
*Fig. 3* toolstring architecture

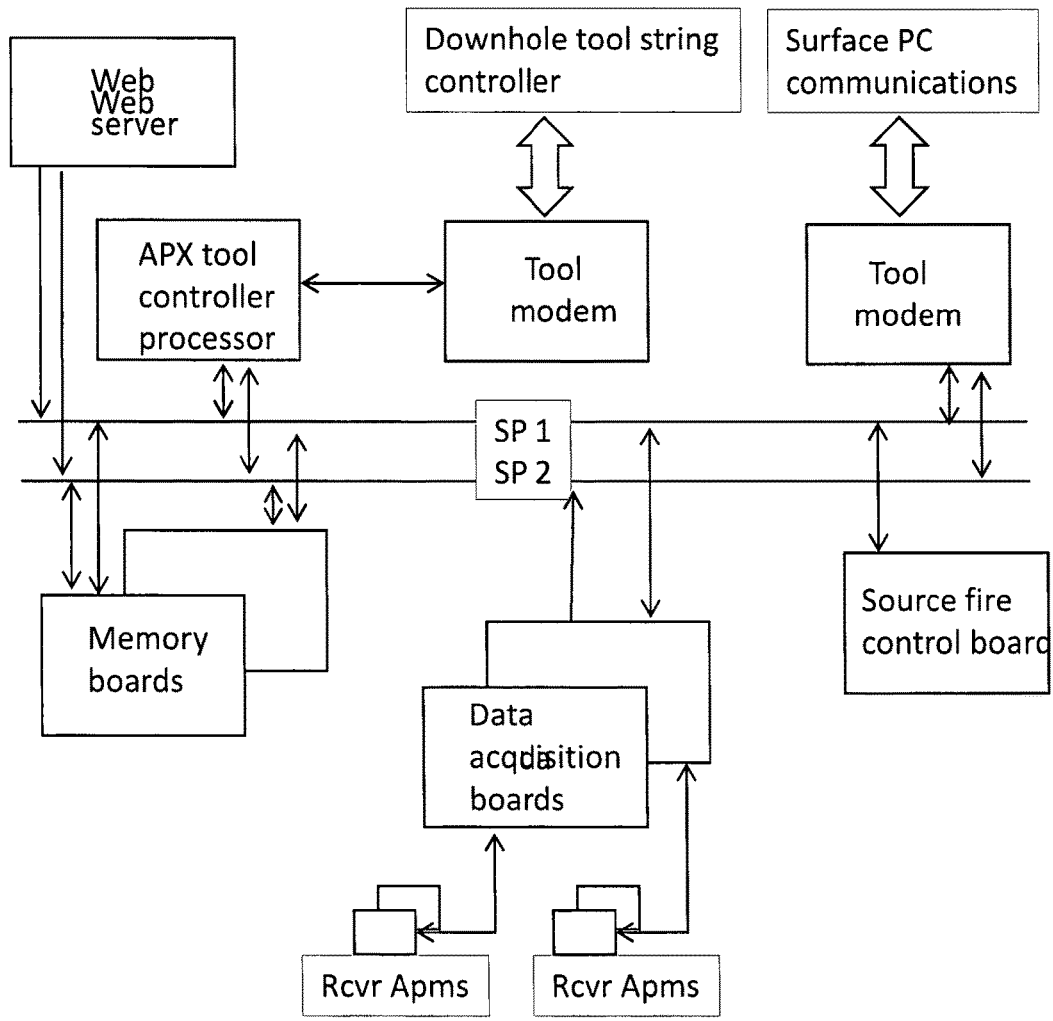
*Fig. 4*: background art, redrawn from GB2406121

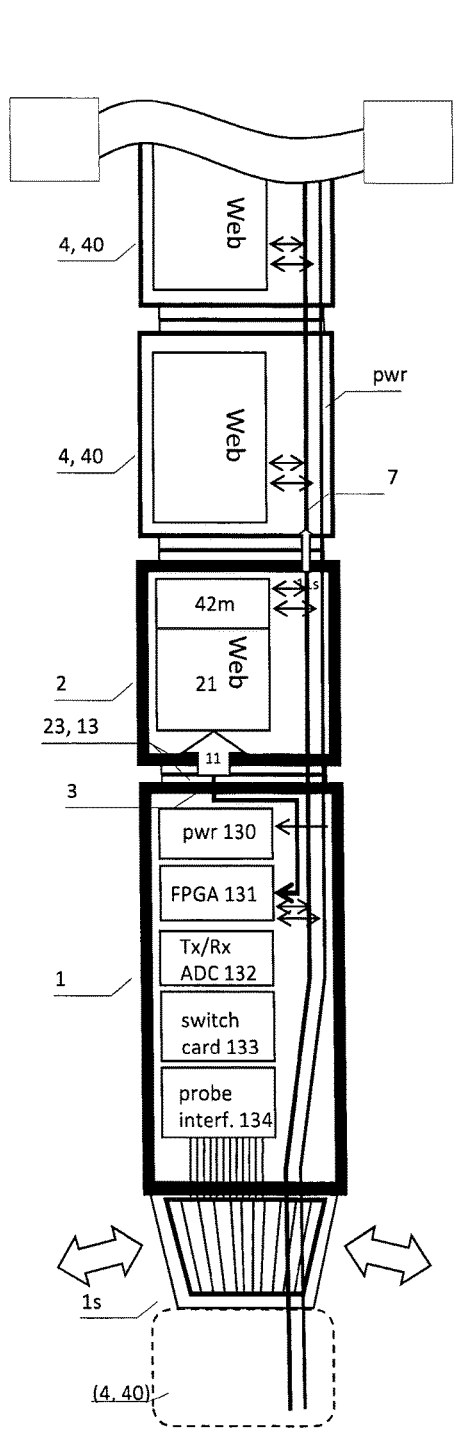
*Fig. 5a*: lower part of an embodiment showing the memory tool (2) and high-resolution ultrasound tool (1).
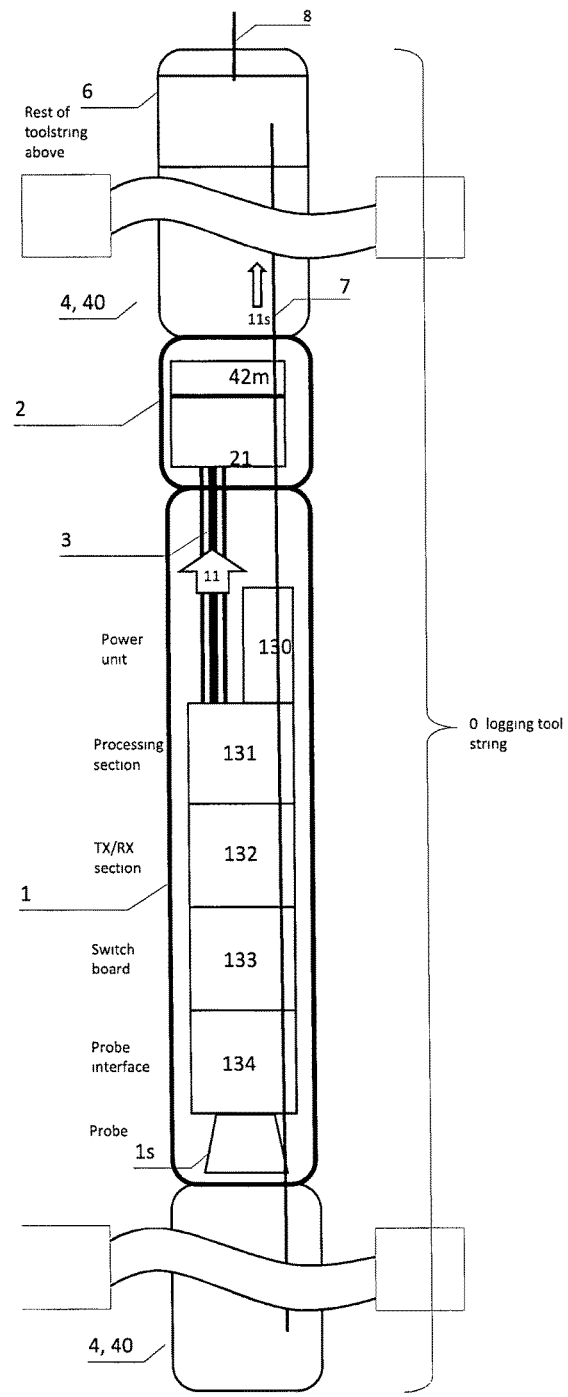
*Fig. 5b*
More generalized logging tool with comm. to surface via signal cable and with one (or more) high data volume producing tools (each) connected to a memory tool.

PETROLEUM WELL DOWNHOLE LOGGING TOOL WITH HIGH SPEED DATA BUS

INTRODUCTION

The invention is a petroleum well downhole logging tool. The logging tool comprises a wireline downhole telemetry controller unit (6) with a downhole modem (61) with a first, relatively low data bit rate which has a relatively slow uplink speed and arranged at least for transmitting data uplink on a wireline (8) to a surface telemetry unit (106) connected to a surface read-out unit (SRO), and a server toolbus controller (62) connected between said downhole modem (61) and an internal tool databus (7) operating at a second bitrate (r2) being higher than or equal to said first bitrate (r1) for the wireline telemetry. The first bitrate (r1) must be adapted to the length of the signal cable between the logging tool and the surface telemetry unit and to the prevailing electromagnetic noise conditions on the cable. The second bitrate (r2), that on the internal tool databus, is typically ten times faster than the telemetry first bitrate (r1). The internal tool databus (7) is connected to one or more logging tools (4) each with corresponding sensors which we may call low data volume sensors (40a, 40b, 40c, . . . ). The present invention further comprises a memory tool unit (2) with a memory section (21) with a third bit rate, a relatively high IO speed and capacity compared to said second bit rate on said toolbus (7), and connected to said internal tool databus (7) via a memory tool client toolbus controller (42m) connected to said tool databus (7) and arranged for communicating with said server toolbus controller (62), and a downhole internal local high bit rate data bus (3) to a high data volume producing tool (1) such as a high resolution ultrasound imaging or measurement tool (1), a high-resolution camera, an electromagnetic acoustic transducer "EMAT", or a multi channel electromagnetic tool, which provides high data volumes or high-resolution data (11), i.e. data at a high bitrate output. Then the memory tool (2) may transmit large parts (11s) of said high volume data (11) when the capacity of the telemetry controller unit (6) allows to do so, i.e. when there is available capacity on the uplink on the wireline (8) and its associated modems (61, 106). The surface read-out unit (SRO) will keep an inventory record to know which parts have been uploaded from the memory tool (2). A part (11s) of the data from the memory tool (2) such as a relatively small, low-resolution b/w image may be uploaded so as for an operator to get said low-resolution image or other measurements which may prove sufficient for controlling the ongoing operation or for determining which parts of the well that should undergo further detailed, high-resolution or high data volume measurements. More parts (11s) of the high data volume (11s) may be uploaded in the background irrespective of the operator's observation of the low-resolution image.

BACKGROUND ART

GB-patent GB2406121B "A method and apparatus for high speed data dumping and communication for a down hole tool" describes multiple internal SPI busses for allowing rapid dumping of data via a tool interface to a PC when the tool is on the surface. It comprises a toolstring with several tools such as a source fire control board, data acquisition boards and memory boards, all connected to two or more SPI busses which allow for dumping data at high speed to an ESPI device being connected directly while on the surface to a PC for fast dumping of data. While downhole and operating it communicates via an APX controller processor and a tool modem via a logging tool modem connected to a wireline for telemetry to and from the surface.

This GB2406121B thus describes an internal high speed bus in the entire tool. The EPSI module is for increasing the dumping rate from the tool to a surface computer when the tool is out of the well. The purpose of the doubling of the SPI lines is to increase the combined speed of the tool databus so as for feeding the ESPI module in order to utilize a full Ethernet capacity when the tool is at the surface.

Advantages of the present invention relative to the above GB patent are presented under a separate section below.

BRIEF SUMMARY OF THE INVENTION

Invention as an Entire Tool String (0)

The invention is a petroleum well downhole logging tool (0) comprising
- a wireline telemetry controller unit (6) comprising
  - a downhole modem (61) with a first bitrate (r1) arranged at least for transmitting data uplink on a wireline (8) to a surface telemetry unit (106) with a surface read-out unit (SRO) with a memory (123),
  - a server toolbus controller (62) connected between said downhole modem (61) and an internal tool databus (7) operating at a second bitrate (r2) being higher than or equal to said first bitrate (r1);
- one or more logging tools (4) each with corresponding sensors (40a, 40b, 40c, . . . ) producing a low data volume, and a client toolbus controller (42) connected on said tool databus (7), for being polled by said server toolbus controller (62) for transmitting sensor data (41a, 41b, 41c, . . . ) from said low data volume sensors, said downhole logging tool (0) distinguished from the background art by the following features:
- a memory tool unit (2) connected to said internal tool databus (7) via a memory tool client toolbus controller (42m) for communicating with said server toolbus controller (62), and with a memory section (21) with high IO speed and capacity, and
- an internal local high speed data bus (3) with a third bitrate (r3) higher than said second bitrate (r2), to a high data volume producing logging tool (1) with one or more sensors (1s), which provides high volume data (11) at a bitrate equal to or less than said third bitrate (r3) and higher than said second bitrate (r2),
- said memory tool (2) arranged for transmitting a part (11s) of said high-volume data (11) via said internal tool databus (7) online to said server toolbus controller (62) during logging, and
- an uplink capacity indicator device (71) in said surface read-out unit (SRO) or toolbus server controller (62) arranged for negotiating transmission with said memory tool (2) for uploading more of or all of said high-volume data (11) via said server toolbus controller (62) to said surface telemetry unit (106) and said surface read-out unit (SRO) if said uplink capacity indicator device (71) indicates available uplink capacity.

Invention as a Memory Tool Section (2).

Figures 2A, 2B:
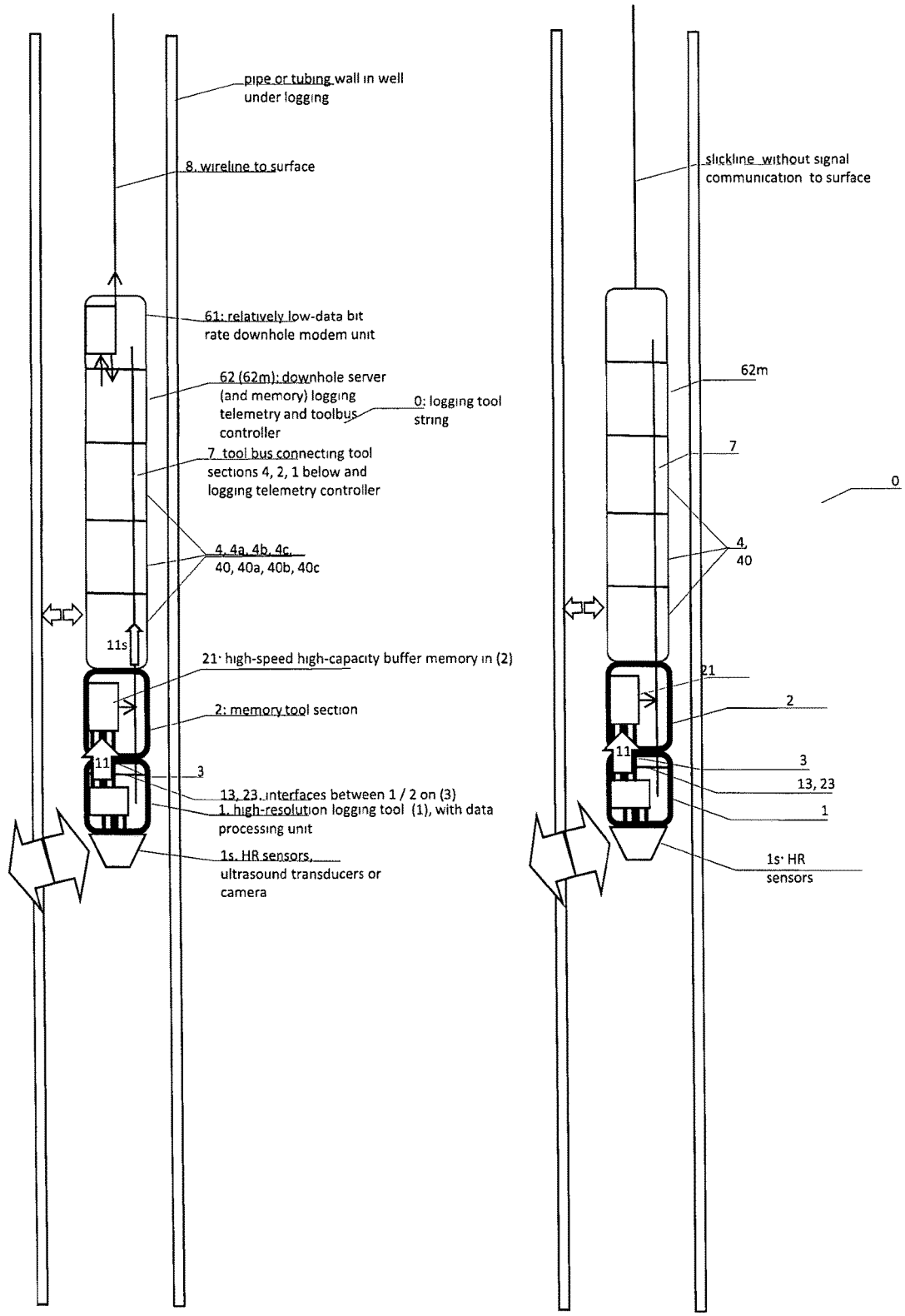

In another aspect, the invention is a memory tool section (2) for use primarily without communication to the surface during logging, such as on a slickline, please see FIG. 2b, without a surface read-out. More specifically, the invention in this aspect is a memory tool unit (2) for use in a petroleum well downhole logging tool string (0), said tool string comprising a battery unit (66) for providing electrical energy to instruments in the tool string (0), a memory toolbus controller (62m) connected to an internal tool databus (7), one or more comparatively low-data bit rate producing logging tool (4a, 4b, 4c, . . . ) each with low data volume producing sensors (40a, 40b, 40c, . . . ), and a client toolbus controller (42a, 42b, 42c, . . . ) connected on a tool databus (7), for being polled by said memory toolbus controller (62m) for transmitting sensor data (41a, 41b, 41c, . . . ) from said sensors (40), The logging tools (4a, 4b, 4c, . . . ) may be arranged each in their separate toolstring section. The memory tool section (2) comprises a memory section (21) with relatively high IO speed and capacity and connected to said internal tool databus (7) via a memory tool client toolbus controller (42m) and arranged for communicating with said toolbus controller (62), said memory tool (2) further provided with an internal local high speed data bus (3) operating at a third bitrate (r3) higher than said second bitrate (r2). The memory tool (2) comprises an interface (23) to a corresponding interface (13) on a high volume data producing tool (1) such as a high-resolution logging tool (1) with one or more sensors (1s) which provides high-volume data (11) at a bitrate (r3) more than said second bitrate (r2). In such a stripped version the memory tool (2) may operate without communication.

If such an embodiment shall be used in an online wireline operation, the memory toolbus controller (62m) must be in an embodiment arranged to work as a server toolbus controller. The logging tool (0) may be arranged for transmitting a part (11s) of said high volume data (11) via said internal tool databus (7) online to said server toolbus controller (62) during logging, and provided with an uplink capacity indicator device (71) in a surface read-out unit (SRO) or in said said server toolbus controller (62) arranged for negotiating transmission with said memory tool (2) for uploading more of or all of said high-volume data (11) via said server toolbus controller (62) to said surface telemetry unit (106) and said surface read-out unit (SRO) if said uplink capacity indicator device (71) indicates available uplink capacity. Then it is provided as the wireline version above with a wireline telemetry controller unit (6) with a downhole modem (61) with a first data bit rate (r1) uplink speed and arranged at least for transmitting data uplink on a wireline (8) to a surface telemetry unit (106) connected to a surface read-out unit (SRO) with a memory (123).

FIGURE CAPTIONS

FIG. 1 is a generalized illustration of a petroleum well having a casing and a production piping wherein a wireline tool logging tool according to the invention is lowered on a wireline or signal conductor fibre composite cable from the surface. On the surface there is a surface read-out unit connected to the wireline or fibre composite cable. There is arranged a lock chamber and a tractor belt injector, a gooseneck and a wireline or cable drum for the cable.

FIG. 2a illustrates a toolstring of a wireline, downhole modem, a downhole server toolbus controller to a through running toolbus to one or more ordinary logging tools not of high resolution, and further to an internally interconnected memory tool and a high resolution tool, here arranged at the lower end of the toolstring. Please notice in FIG. 2c that there may be several groups of memory section (2) and high data volume producing tool (1).

FIG. 2b illustrates a toolstring (0) using a slickline (i.e. without communication between the logging toolstring and the surface), a downhole memory toolbus controller is connected to a through running toolbus (7) to one or more "ordinary" logging tools (4) which do not produce high volumes of data, and is further connected to an interconnected memory tool which is locally connected to receive high data volumes from a high resolution tool which produces data at a high bit rate. Here the memory tool (2) and the high resolution measurement tool (1) are arranged at the lower end of the toolstring. In this embodiment the tool is run using the memory toolbus controller to store the data from the logging tools (4) and the memory tool (2) to store the data from the high-density measurement tool (1). The data from both the ordinary logging tools (4) and the high-density logging tool (1) are stored in the memory server (62) and the memory tool (2), respectively, and are retrieved when the logging tool string (0) has been retrieved from the well and brought to the surface.

Figure 2C:
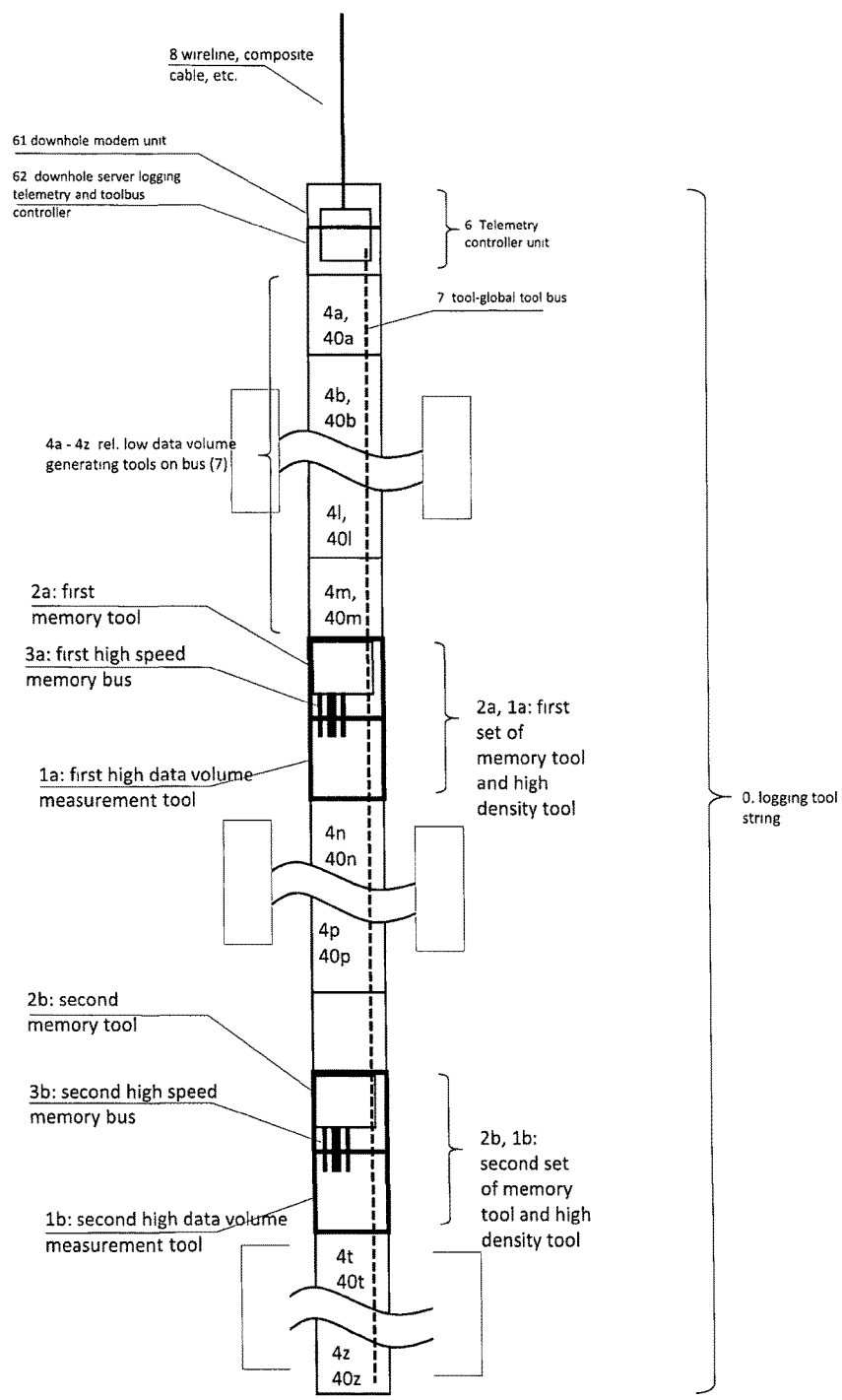

FIG. 2c is an illustration of an embodiment of a toolstring comprising a wireline, a composite fibre cable, or similar telemetry cable (8) with "ordinary" low data volume generating logging tools (4, 4a, 4b, . . . , 4z) in interconnected sections and connected on a toolstring-global tool bus (7) connected to the downhole toolbus controller and logging telemetry server (62), and communicating via the downhole modem unit (61) on the cable (8) to the surface telemetry modem (106) by the surface read-out unit (SRO). The logging string (0)

FIG. 3 is an illustration of the toolstring architecture of the present invention, including the toolstring-global toolbus (7), and the memory tool (2) with the high-speed data bus (3) locally to the high-data volume tool (1) according to the invention. In an embodiment of the invention, as indicated in FIG. 3 may the toolstring-global toolbus (7) extending through the high data volume tool (1). In the extension of the toolbus (7) there may be "ordinary" tools (4) below. There may also be one or more other memory tools (2) each with their high data volume tool connected on its local high speed data bus (3).

FIG. 4 is an illustration redrawn of background art from (FIG. 2) of GB2406121B. Please notice the absence of a separate high-capacity databus from the data acquisition boards to the memory boards; the purpose of the multiplicity of the internal buses SP1, SP2 is to improve data dumping speeds through the tool modem to the surface PC communications directly connected while on the surface, and the buses SP1, SP2 extend over all connected boards, actually playing the role of an ordinary toolbus (7).

FIG. 5a is an illustration of a particular embodiment of the invention showing a lower part of the logging tool string (0) comprising "ordinary low-data volume producing" logging instrument sections (4) on a toolbus (7), and a memory tool section (2) of the invention with a high data volume producing, high-resolution ultrasound tool (1), the latter two connected by the high-speed local data bus (3) of the invention. The illustrated embodiment indicates a generally horizontally, peripherally transmitting ring of ultrasound transmitters and sensors, thus there is space in the sensor ring for signal and power cables for instruments further down. That would not be the case for a lowermost sensor oriented straight down such as a down-looking ultrasound sensor or high-resolution camera.

FIG. 5b is a more generalized illustration of the invention wherein the tool string (0) comprises a wireline-borne telemetry unit with a toolbus server unit for a toolbus (7) to one or more measurement tools (4) producing low data volumes, and a memory tool (2) locally connected via a local high speed data bus (3) to a high data volume producing tool (1). In the embodiment illustrated the tool (1) comprises a power unit (130), a processing section (131), a transmitter and receiver section (132), a switch board (133) (optional) to a probe interface (134) connecting to the probes (1s). Thus the illustration in FIG. 5a represents a particular embodiment of the generalized version in FIG. 5b. There may be one, two or more such high-data volume units (1, 2) connected in the tool string (0), and they have to be polled in turn for delivering data to the surface.

EMBODIMENTS OF THE INVENTION

General

In an embodiment of the invention a petroleum well downhole logging tool string (0) comprises a wireline telemetry controller unit (6) with a relatively slow uplink speed via a downhole modem (61) with a first, relatively low data bit rate. The downhole modem (61) is arranged at least for transmitting data (41) up on a wireline (8) to a surface telemetry unit (106) connected to a surface read-out unit (SRO) with a memory (123). In an embodiment the first uplink speed is 250 kbps but must be adjusted according to noise on the line and the length of the line. Usually the first bitrate (r1) on the telemetry link is much less than a second bitrate (r2) on an internal tool databus (7) mentioned below. Preferably the telemetry also has a downlink capacity, with a low speed of, say 16 kbps, for sending command instructions to the telemetry unit and the one or more logging tools (4, 1) mentioned below. The wireline (8) may have a voltage of typically 100 to 1000 V. The petroleum well downhole logging tool (0) is used in a well environment illustrated in FIG. 1, in a petroleum well having a casing and a production piping wherein a wireline tool logging tool according to the invention is lowered on a wireline from the surface. On the surface there is a surface read-out unit (SRO) connected to the wireline.

Toolbus Controller

Further the logging tool string (0) comprises a server toolbus controller (62) connected between said downhole modem (61) and an internal tool databus (7), such as of an ordinary type, e.g. RS485. The internal tool databus (7) is run at a second bitrate (r2) between 1 and 2 Mb/s, usually significantly larger than the first bitrate on the telemetry link. On a mono conductor toolbus the bit rate can typically be 500 kbps. There is no point running it at a higher bit rate than what the uplink via the wireline (8) allows, which is the limiting factor due to long signal lines which are subject to attenuation and noise. The reason for using differential signaling is that for large diameter tools, we need immunity against noise, e.g. for use with electrical motors or other electrical actuators. Another reason for selecting RS485 is that the toolbus protocol will be universal for many different logging tools and that it may be possible to run at elevated temperatures. The server toolbus controller (62) is preferably arranged near the top of the toolstring, near the downhole modem (61) and polls the logging tools (4) for data. It is arranged as a wireline server. In an embodiment it may be arranged as a memory toolbus controller (62m).

Currently, RS485 drivers are available for 210° C., SN65HVD11-HT, which may possibly work at even higher temperatures.

The server toolbus controller (62) will supply low voltage DC on a low voltage supply line (72) for power to the tools on the toolstring. In an embodiment the voltage on the low voltage supply line (72) is 30 V.

Low Data Volume Logging Tools

The logging tool string (0) has one or more logging tools (4a, 4b, 4c, . . . ) connected on the internal tool databus (7), each with corresponding low data volume sensors (40a, 40b, 40c, . . . ). The term "low data volume" producing sensors are, in the present context, sensors which provide data of sufficiently small amount, such as orientation data, pressure data, etc., to allow online transmission (or what is considered as online transmission) to the surface read-out unit during logging.

A client toolbus controller (42) in each logging tool (4) is connected on said tool databus (7), for being polled by said server toolbus controller (62) for transmitting sensor data (41a, 41b, 41c, . . . ) from said sensors. The telemetry controller unit (6) unit polls the logging tools (4) for data, and may have a limited memory, and sends data via the downhole modem (61) to the surface. The downhole modem (61) comprises programmed electronics which puts data on the wireline for transmission and which also receives surface commands from the wireline and forwards them to the server toolbus controller (62), which further controls the logging tools (4) on the databus (7). The ordinary logging tools, the low data volume producing logging tools (4) will have through electrical conductors for the internal tool databus (7), a wireline through wire, ground line(s) and the low voltage supply line (72).

Memory Tool Section

The downhole logging tool (0) further comprises a memory [or data storage] tool unit (2), preferably embodied as a separate tool section of the tool string (0), with a memory section (21) with relatively high IO bitrate, the third bit rate (r3) on the internal local high speed data bus (3) to the high data volume producing tool (1), and connected to said internal tool databus (7) via a memory tool client toolbus controller (42m) connected to said tool databus (7) and arranged for communicating with said server toolbus controller (62). The high-resolution logging tool (1) is provided with one or more sensors (1s) which provide high volume, or high-resolution data (11) to the internal high speed data bus (3). In this way, the memory tool (2) appears, as seem from the client toolbus controller (42) and the tool databus (7) as an ordinary "low data volume" tool operating at the second, lower bit rate (r2) allowable on the tool databus (7). From the high data volume producing tool's (1) side, it appears as a high speed data line operating at the higher bit rate (r3) to a data storage.

In an embodiment the high-resolution logging tool (1) will have a local processor such as an FPGA (131) for time framing and filtering, combining, and otherwise reducing the enormous amount of measurement data delivered from the large array of sensors to digital images of the parameter to be presented. The high-resolution logging tool (1) is for practical reasons preferably arranged adjacent to the memory tool (2).

In an embodiment of the invention high-volume logging tool (1) of the invention is a high-resolution ultrasound logging tool, please see FIG. 5a, which comprises a housing with:

a power supply unit (130), one or more boards (131) with processing units, i.e. FPGAs, microcontrollers, DSPs (digital signal processors) and/or microprocessors, which together do the necessary processing, communication and control operations, one or more units (132) with digital to analogue converters that convert the digital signals to analogue signals and a transmit circuit that amplifies the analogue signals to necessary voltage levels a switch card (133) arranged for connecting the transmit/receive circuits to the desired channels on a probe interface (134) to an ultrasound transducer array (135), and transmit-receive switches arranged for switching between transmit mode and receive mode, a receive section with one or more TVG (time-variable gain) amplifiers that amplify the received signals to appropriate levels, one or more ADCs (analogue to digital converters) that digitize the analogue received signals and feed them into the processing units.

Passive Sensors:

The memory section (2) of the invention may in an embodiment be connected to a passive acoustic tool (1), a special embodiment of the tool shown in FIG. 5a, producing high volumes of data (11), the passive acoustic tool used for detecting sounds generated by leaks in wells. 10. Such an embodiment of the tool does not necessarily comprise a transmitter array, only a receiver array. A passive acoustic tool may be used for detecting either leaks, unwanted flow and hence integrity problems, particle impact and hence sand production. The tool will then act as a receiver which records the down-hole noise and feeds it into the memory for later analysis.

The memory tool section (2) in such an embodiment with its memory section (21) is connected via a local high-speed data bus (3) over interfaces (23, 13) to said high data-volume tool section (1), wherein said high-resolution tool comprises a housing with:

a power supply unit (130)

one or more boards (131) with processing units, such as FPGAs, microcontrollers, DSPs (digital signal processors) and/or microprocessors, arranged for processing, communication and control operations one or more passive acoustic sensors (1s) connected to a receive section (132) with one or more time-variable gain amplifiers that amplify the received signals to appropriate levels one or more analogue to digital converters (132) that digitize the analogue received signals and feed them into the processing units (130).

Details on the Memory Section

In an embodiment the memory section (21) comprises a so-called FLASH memory which is capable of receiving the high volume data (11) from said high speed data bus (3) with a third bitrate (r3) higher than the second bitrate (r2), that of the internal databus (7), and to transmit data further to said memory tool client toolbus controller (42m) at a lower bitrate adapted to the second bitrate (r2) of the ordinary tool databus (7). In an embodiment of the invention the size of the FLASH memory is 16 Gbytes or more. In general the memory tool (2) is designed to operate at 180° C. Flash memory pages typically consist of 2040 data bytes+64 error control bytes, 2112 bytes total per page. At this byte page size it typically takes 700 μs maximally to program plus 90 μs to load at 25 MHz, assuming a little overhead to set up. However, it is possible to program 2 pages at a time, hence 2×2048 byte, or 2×32768 bits pages takes approximately 900 μs to load and program at 25 MHz, ie 36 Mbps. Hence, to achieve close to 75 Mbps, it is sufficient to program two planes and two chips at a time, which will obtain 72 Mbps writing speed to the flash memory in worst case. Although this is slightly less than 75 Mbps one must assume that the high data volume tool (1) would have some 25% dead time so 75 Mbps is not acquired continuously at the high data volume producing tool (1). For a preferred flash memory chip type the maximum write cycle time is 40 MHz, so 25 MHz is a practical maximum for operating at well temperatures at about 180° C.

Memory Tool as Separate Tool Section

The memory tool (2) is in an embodiment of the invention designed as a separately mechanically insertable tool section housing with ordinary top- and bottom pressure-proof joints with signal and power connectors, which is placed into the toolstring immediately above the high data volume producing tool (1), please see FIGS. 2a, 2b, and 2c. To the mechanical engineer it may look similar to other logging tool sections. As a separate tool section the memory tool section (2) may be disconnected from the toolstring after retrieval from the well topsides and taken into a safe environment for downloading high volume data from the tool if not all of the parts (11s) have been transferred on the wireline (8) before the tool was retrieved topsides. As a separate tool section the memory tool (2) will also allow the operator to select any high data volume or high-resolution tool (1) to be mounted into the tool string, such as replacing a multi-sensor ultrasound array sensor by a high-resolution camera, as long as it communicates according to a protocol on the internal local high-speed data bus (3). In one embodiment the high-speed data bus (3) may be used for uploading the contents of memory (21) to a directly connected computer while topside. In another embodiment, the memory tool (2) may be provided with a separate USB interface for uploading still remaining parts (11s) of data (11) when topsides.

Memory Tool as Buffer, Capacity Indicator

The memory tool (2) is arranged for working as a large buffer, transmitting parts (11s) of said high-resolution data (11) via said internal tool databus (7) online to said server toolbus controller (62) during logging, and the system is provided with a uplink capacity indicator device (71) in said surface-read-out unit (SRO) or in said server toolbus controller (62) arranged for negotiating transmission with said memory tool (2) for uploading more of or all of said high-resolution data (11) via said server toolbus controller (62) to said surface telemetry unit (106) and said surface read-out unit (SRO) with said memory (123) if said uplink capacity indicator device (71) indicates available uplink capacity.

Online Low-Resolution Data to Surface

The memory tool (2) is in an embodiment arranged for transmitting part (11s) of said high-resolution data (11) such as low-resolution image extracts (11e) of said high-resolution data (11). Subsets of the data are defined by time stamps or file identifiers/tags which are synchronized with the surface-read-out unit (SRO) and coupled to logging depth and other toolbus data which are not stored in memory (21). The parts (11s) may be on a data format as follows:

address, command, NumBytes, <data>, CRC (CRC=cyclic redundancy control). In this way an operator by the surface read-out unit (SRO) may monitor low-resolution images based on said part (11s) of said high volume data (11) supplied online to the surface. The low-resolution images based on the parts (11s) need only be of sufficient quality to allow the operator control the logging process to allow smooth operation and to check sensor and data integrity. The operator may also operate on the basis of the low-resolution images to locate, orient and control the high resolution logging tool (1) (and possibly the other logging tools (4)) to conduct data acquisition in more detail in desired depths of the well, with desired orientation, and desired resolution.

In an embodiment of the invention the internal local high speed data bus (3) may be a 5-way LVDS bus preferably operating at 100 Mb/s.

Memory Tool as Apparent Online Low Data Volume Logging Tool

During operation, the operator may communicate via the surface read-out unit (SRO) or other control panel to control the high-resolution data tool (1) via the memory tool (2), which will appear instantly as a low-resolution high-resolution tool to the operator. The memory tool's (2) electronics will be polled for parts (11*s*) at a time of the high data volume buffered from high data volume tool (1) and set the operational parameters for the high-volume producing data tool (1) and its required data rate instructed by the operator. The memory tool is arranged for receiving and storing all data arriving over the high speed data bus (3), and buffer a major proportion of the data from the high-resolution tool as described above.

The toolstring with the memory tool (2) may comprise more than one high-resolution tool which produces data at a high bit rate. Such a second high-resolution tool may be provided with its own second memory tool (2) which may be set to buffer and store all data from the second high-resolution tool while the first high-resolution tool produces data at a high bit rate to the first memory tool (2) which operates as described above.

Data Inventory

In an embodiment of the invention, the petroleum well downhole logging tool (0) the memory tool (2) arranged for receiving high-resolution data from said high-resolution logging tool (1) and keeping track of which parts (11*s*) of the high-resolution data are sent to the surface via the internal tool databus (7) and the server toolbus controller (62), and which other part that is kept in said memory section (21), considered as a buffer. Inventory data from the memory tool (2) may be sent for updating information on the surface read-out unit SRO on which information is received in the memory (124) of the surface-read-out (SRO), and which other, remaining part of high-resolution data remaining in the downhole memory section (21) at any time. In this way the memory section (21) may be commanded from the surface to erase those parts of the memory space having been occupied by data which are confirmed received at the SRO.

Multi-Transducer Ultrasound Tool

In an embodiment of the invention the high-resolution logging tool (1) is a side-scanning high-resolution multi-transducer ultrasound tool (1) such as illustrated in FIG. 5, for imaging using more than one hundred ultrasound transducers and with internal pre-processing and which produces much more data at a bit rate which exceeds the available second bitrate (r2) on the internal tool databus (7) and particularly the first bitrate on the downhole modem (61) to the wireline (8), thus it becomes necessary to write data temporarily to the memory section (21) and using that as a buffer during logging, and transferring high-resolution data from said memory section (21) to the surface read-out unit (SRO) when the line capacity over the wireline (8) becomes ready at other times. FIG. 5 shows the combination of the memory tool section (2) with its memory section (21) connected via a local high-speed data bus (3) over interfaces (23, 13) to the high-resolution tool section (1). As an example, the high-resolution tool illustrated here has an FPGA processor (131) and a power card (132) in the upper part of the tool housing, followed by a transmitter/receiver ADC electronic card (132) controlled and connected to the processor (131), further connected to a switch card (133) arranged for connecting the transmitter/receiver ADC card (132) to desired channels on a probe interface (134) to an ultrasound conical ring transducer (135) protected by a conical window (136). The FPGA may be commanded or reprogrammed from the surface read-out (SRO) control panel to switch operations between conducting doppler measurements to a desired depth through casing, or for doppler measurements in the liquid for detecting speed of bubbles, or for conducting imaging of the tubing wall or measuring tubing thickness. Signal amplifiers for transmitted and received signals may be arranged between the processing section, the transmitter/receiver section and the switch board as appropriate for amplifying outgoing and incoming signals to and from the ultrasound transmitters/receivers.

In other realisations of the high-resolution tool, the FPGA processor may be replaced by a number of processing units, i.e. FPGAs, microcontrollers, DSPs (digital signal processors) and/or microprocessors, which together do the necessary processing, communication and control operations. Also in this case the combined operation of all the processing units is controlled and can be reprogrammed from surface.

Operating the Instrument

In normal logging mode, the high volume data producing logging tool (1), such as a high-resolution ultrasound lateral view or downward directed view tool with a multi-transducer ultrasound array as described above is connected to the memory tool (2). The memory tool (2) and the high volume producing logging tool (1) then appear as two separate tools to the server toolbus controller (62). The server toolbus controller (62) will then poll the high-resolution data tool as frequently as possible given the uplink speed available on the wireline (8) and depending on the other "ordinary" low data producing logging tools (4) in use simultaneously. The memory tool (2) then appears as another tool on the toolbus (7) to the telemetry controller's server toolbus controller (62).

However, the memory tool (2) may be instructed to poll the high data volume producing tool (1) for data at a much higher rate via the internal local high-speed bus (3) than the traffic on the ordinary toolbus (7). Those data are then stored in the memory section (21) of the memory tool (2). It is expected that the internal local high-speed bus (3), which may be an LVDS-bus, will run at 100 Mbps or more.

In an embodiment of the invention wherein there are two or more groups of memory tool (2) and high data volume producing tool (1) in the same logging string, one of the groups may use its memory tool (2) as a temporary storage for all or most data (11) from its corresponding high data volume producing tool (1), while the other one of the groups may operate with the memory tool (2) as a buffer for the high volume data (11) from its corresponding high volume producing tool (1) while transmitting part (11*s*) of said data to the surface via the toolbus (7) and the telemetry unit (6), and when all data are transmitted the first group may resume transmitting part (11*s*) of its data to the surface.

Example 1

Consider that the high resolution data tool only can transmit ⅕ of the recorded data, a part (11*s*) or subset of the measured data (11), through the telemetry while scanning due to telemetry capacity limitations. All data parts (11*s*) sent to the surface via telemetry are recorded and displayed by the surface software at the surface read-out (SRO). Now assume that each measurement data set contains a unique ID, such as a timestamp as well as a sequence number (or similar). All measured, processed data (11) (also the data parts (11s) already sent to the toolbus and telemetry) are simultaneously fed to the memory tool (2) for storage. Now the surface software keeps track of all recorded parts of the data (11s) recorded at the surface and remaining subsets or data sets (11s) "missing", i.e. not yet transferred to the surface (identifiable due to the sequence number stored together with each measurement). The surface software knows that the remaining data sets (11s) are stored in the memory tool (2). When there is little other traffic on the telemetry, e.g. when there is a pause in the logging or the remaining instruments (4) are not logging, the surface software in the surface read-out unit (SRO) can poll the memory tool (2) for further parts (11s) or subsets of the "missing" data sets known to be still residing in said memory tool (2) only. In this way a complete high resolution data set (11) is eventually transferred to the topside software without needing to pull the toolstring (0) out of the hole.

Example 2

Consider that the high resolution data tool (1) has the ability to and compress the measurement data (11) through a lossy compression technique. Examples may be JPEG or parameter extraction through processing, e.g. thickness data of tubing processed from analysis of ultrasound waveform. The compressed data (11s) can then be sent to the toolbus (7) and telemetry while the uncompressed data (11) can be stored in the memory tool sections (2) memory (21) as a buffer for later, on-line retrieval over wireline (8) for post-processing. In this way the operator can get real-time feedback of the logging job and make a preliminary report/status based on the compressed data sent to the surface software, while a more thorough post-analysis can be made from the uncompressed data (11) in the memory tool (2) at a later stage, either via the wireline using the present invention or by data dumping while the tool is topsides.

Example 3

Consider that the telemetry link on the telemetry modem (61), the wireline (8) and the surface telemetry modem (106) is really poor (due to electrical noise on the platform or in the well, degraded logging cable or similar) and the surface operator is only able to send very short messages or in a slow signal speed to and from the toolstring (0) in the well. Then the operator can initiate the logging job such that all data goes into memory (21) in the memory tool (2). The data can then be uploaded and analyzed afterwards, preferably through the wireline (8) if telemetry conditions improve later during the logging operation.

ADVANTAGES OF THE INVENTION

Operator Control Through Low-Resolution Online Data

A first advantage of the present invention is the enabling of the operator to use a high-resolution tool which grossly exceeds the uplink capacity on the wireline to obtain low-resolution images or otherwise low-resolution data on the surface read-out unit topsides in order to control and command the downhole data acquisition process. The operator may use online low-resolution images from the high-resolution tool while he lets the high-resolution tool pass along section in the well wherein he expects to find or desire to conduct his high-resolution logging, and determine the exact depths and/or orientations for a subsequent high-resolution run. Alternatively, he may desire from the low resolution images received online that the high-resolution tool actually already has conducted and buffered in the memory tool the high-resolution acquisition as desired as determined from the low-resolution data transmitted online.

Instrument Mode Switching

Another advantage of the invention is that the operator may use low-resolution online measurement for directing or otherwise control the high-resolution tool to conduct measurements such as ultrasound transducer array measurements in desired modes, focusing at desired lateral depths or distances, into desired materials, and with desired orientations. Such mode changes may be between ultrasound Doppler measurements of production fluid velocity measurements, production pipe wall imaging, wall thickness measurements, and measurement through the pipe wall of flow outside piping. Tool-internal filtering settings, time windows, logging depth etc. may be controlled from topsides.

The buffered measurement data (11) in the memory tool (2) may be transmitted as indicated above, upon negotiation for transmission time on the ordinary tool databus (7). This is particularly useful when the online logging operation using the "ordinary" low-resolution online logging tools along the desired length of the well, as they, except for casing collar locators and the like, then no longer require capacity on the tool databus (7) which allows more data to be transferred from the buffer in the memory tool (2). In an embodiment the transfer of data may occur during transporting the toolstring to a new logging depth in the well (not all depth sections between production zones may be interesting) and may also occur during hauling from the upper logging depth, which may be several hundreds to thousands of meters up through the cased well through the geological overburden and possibly also up back through a high marine riser to a platform.

Versatility of Memory Tool Section (2)

The memory tool (2) section is provided with a HR tool interface (23) at least comprising connectors for power, the high-speed toolbus (3), and possibly connectors and through lines for the ordinary toolbus (7) which for some side-looking configurations of the high-resolution tool (1) may continue down through the entire tool (1) for possible connection of one or more further tool sections (4), please see FIG. 2c, FIG. 3. The interface (23) may connect to a corresponding high pressure proof interface (13) on a selected type of high-resolution logging tool (1) such as a multi-sensor ultrasound array sensor, a high-resolution camera, as long as the tool (1) at least communicates according to a protocol on the internal local high-speed data bus (3).

Advantages over GB2406121B

The present invention allows measuring using a high-resolution tool which produces measurement data at a rate which far exceeds the tool bus rate under ordinary well logging conditions and with existing telemetry, utilizes a local relatively higher-rate bus which is connected via the APX controller to the downhole modem which is connected to the wireline telemetry.

An optional ESPI module is for increasing the transfer rate from memory to a PC via an Ethernet line when the tool is out of the well, and does not improve the data transfer on the wireline when the tool is downhole, because the ESPI module is not directly linked to the telemetry modem on the wireline.

The present invention allows use of a system which comprises a high-density tool section (2), which produces large amounts of measurement data, to fit into a toolstring of otherwise ordinary low-data volume producing instruments, (which are not necessarily low-resolution instruments) and provided with a first toolbus (7) having a relatively moderate data transfer rate, by using a memory tool section (2) which virtually appears as a separate tool which operates on the low-rate toolbus (7) of the toolstring, and which has a local buffer memory (22) of high capacity and a high-speed local, second databus (3) to the high-data volume producing tool (1), for transmitting data via the wireline (8) to the surface when the telemetry capacity otherwise allows, thus utilizing existing toolstrings with a databus of low or moderate capacity with a high data volume producing instrument such as e.g. a high resolution imaging instrument; a HR camera or a HR ultrasound imager.

In essence a difference between the GB patent and the present invention is that the GB patent teaches a high-speed bus for topside data dumping, while the present invention has an internal, local second databus between the high-data volume producing instrument (1) and the memory tool (2) which provides buffer storage for an amount of data (11) which exceeds the telemetry capacity on the wireline, and otherwise utilizes the telemetry for uploading parts (11s) of the data when a capacity meter indicates available capacity.

Another difference between the GB patent and the present invention is that the present invention has a high-speed internal databus which runs from the high-density tool to the memory tool as a memory buffer and which sends data further to the surface via a relatively low-speed toolstring databus whenever the telemetry capacity allows while the tool still is downhole, whereas the GB patent has a toolstring-global high-speed parallel bus with an ESPI module for transferring data to a PC while the toolstring is surfaced.

The invention claimed is:

1. A petroleum well downhole logging toolstring (0) comprising:
    a wireline telemetry controller unit (6) comprising:
        a downhole modem (61) with a first bitrate (r1) of 250 kBps or more arranged at least for transmitting data uplink on a wireline (8) to a surface telemetry unit (106) with a surface read-out unit (SRO) with a memory (123);
        a server toolbus controller (62) connected between said downhole modem (61);
    an internal toolstring databus (7) operating at a second bitrate (r2) between 500 kB/s and 2 MB/s being higher than or equal to said first bitrate (r1);
    one or more logging tools (4), each with corresponding sensors (40) producing first data volumes, and with a client toolbus controller (42) connected on said databus (7), for being polled by said server toolbus controller (62) for transmitting said first volume sensor data (41a, 41b, 41c, . . . );
    one or more memory tool units (2), different from the one or more logging tools (4), each said memory tool unit connected to said databus (7) via a memory tool client toolbus controller (42m) for communicating with said server toolbus controller (62), and with a memory section (21) with high IO speed of 72 MB/s and capacity of 16 GB or more, and an internal local high speed data bus (3) with a third bitrate (r3) of 100 MB/s, higher than said second bitrate (r2);
    a high data volume producing logging tool (1), different from the one or more logging tools (4) and the one or more memory tool units (2), comprising a multi-sensor ultrasound unit (14), with one or more sensors (1s) providing high-volume data (11) at up to said third bitrate (r3) and higher than said second bitrate (r2) to the internal local high speed data bus (3) of the one or more memory tool units (2);
    said memory tool (2) arranged for transmitting a part (11s) of said high-volume data (11) via said databus (7) online to said server toolbus controller (62) during logging; and
    an uplink capacity indicator device (71) in said surface read-out unit (SRO) or toolbus server controller (62) arranged for negotiating transmission with said memory tool (2) for subsequently uploading more parts (11s) of said high-volume data (11) via said server toolbus controller (62) to said surface telemetry unit (106) and said surface read-out unit (SRO) if said uplink capacity indicator device (71) indicates available uplink capacity.

2. The petroleum well downhole logging toolstring (0) of claim 1, said memory tool (2) having an inventory (24) for keeping track of which parts (11s) of the high-volume data (11) are confirmed sent to the surface read-out unit (SRO) via the databus (7) and the server toolbus controller (62), and which other parts (11s) that are kept in said memory section (21) as a buffer.

3. The petroleum well downhole logging toolstring (0) of claim 1, said memory tool (2) arranged for transmitting part (11s) of said high-volume data (11) such as low-resolution image extracts (11e) of said high-volume data (11) via said databus (7) and said wireline (8) to said surface read-out (SRO).

4. The petroleum well downhole logging toolstring (0) of claim 1, said surface read-out (SRO) having a corresponding inventory (124) for updating information about which parts (11s) of said high-volume data (11) are received, and which other part of high-volume data (11) remaining in said downhole memory section (21).

5. The petroleum well downhole logging toolstring (0) of claim 1, said high data volume producing logging tool (1) comprising a high-resolution multi-sensor ultrasound unit (14).

6. The petroleum well downhole logging toolstring (0) of claim 1, said downhole modem (61) having said first data bitrate (r1) of 250 kbps or more and arranged at least for transmitting data uplink on said wireline (8) to said surface telemetry unit (106) to said surface-read-out unit (SRO).

7. The petroleum well downhole logging toolstring (0) of claim 1, said memory tool section (2) with its memory section (21) connected via the local high-speed data bus (3) over interfaces (23, 13) to said high-volume producing tool section (1), wherein:
    said high data volume producing tool (1) comprises:
        a power board (130);
        a processing section (131);
        a transmitter/receiver section (132) controlled by and connected to said processing section (131), said transmitter/receiver section (132) further connected to
        a switch board (133) arranged for connecting said transmitter/receiver section (132) to
        a probe interface (134) to
        a high data volume producing sensor (1s).

8. The petroleum well downhole logging toolstring (0) of claim 7,
    said processing section (130) comprising an FPGA processor (131), said transmitter/receiver section (132) comprising a transmitter/receiver ADC electronic card (132), said switch board (133) comprising a switch card (133), arranged for connecting the transmitter/receiver ADC card (132) to desired channels on a probe interface (134) to an ultrasound transducer array (135).

9. The petroleum well downhole logging toolstring (0) of claim 8, said ultrasound transducer array (135) protected by a pressure-proof acoustically transparent window (136).

10. The petroleum well downhole logging toolstring (0) of claim 9, said ultrasound transducer array (135) and said acoustically transparent window (136) having a generally circular cross-section.

11. The petroleum well downhole logging toolstring (0) of claim 8, said ultrasound transducer (135) array having the shape of a conical ring array and protected by a conical window (136).

12. The petroleum well downhole logging toolstring (0) of claim 1, said memory tool section (2) with its memory section (21) connected via the local high-speed data bus (3) over interfaces (23, 13) to said high data-volume tool section (1), wherein said high-resolution tool comprising a housing with:
a power supply unit (130);
one or more boards (131) with processing units, such as FPGAs, microcontrollers, DSPs (digital signal processors) and/or microprocessors, arranged for processing, communication and control operations;
one or more passive acoustic sensors (1*s*) connected to a receive section (132) with one or more time-variable gain amplifiers that amplify the received signals to appropriate levels; and
one or more analogue to digital converters (132) that digitize the analogue received signals and feed them into the processing units (130).

13. A memory tool unit (2) connectable into a petroleum well downhole logging tool string (0) comprising a wireline telemetry controller unit (6) with a downhole modem (61) with a first data bitrate (r1) and arranged at least for transmitting data uplink on a wireline (8) to a surface telemetry unit (106) connectable to a surface read-out unit (SRO) with a memory (123), said downhole modem (61) connected to a server toolbus controller (62) connected to an internal toolstring databus (7) operating at a second bitrate (r2) being higher than or equal to said first bitrate (r1), said logging tool string further provided with one or more logging tools (4) each with corresponding low data volume sensors (40), and a client toolbus controller (42) connected on said databus (7), for being polled via said server toolbus controller (62) for transmitting sensor data (41*a*, 41*b*, 41*c*) from said sensors, said memory tool unit (2), different from the one or more logging tools (4), connected on said databus (7) and comprising a memory section (21) connected via a memory tool client toolbus controller (42*m*) to said databus (7) and communicating with said server toolbus controller (62), wherein said memory tool (2) further comprises:
an internal local high speed data bus (3) operating at a third bitrate (r3) of 100 MB/s being higher than said second bitrate (r2), said memory section (21) connected to the internal local high speed data bus (3);
an interface (23) to a corresponding interface (13) on a high data volume producing logging tool (1), different from the one or more logging tools (4) and the one or more memory tool units (2), said high data volume producing logging tool (1) comprising an ultrasound probe array with one or more sensors (1*s*) which provides a high data volume (11) at a bitrate equal to or lower than said third bitrate (r3) to the internal local high speed data bus (3) of the one or more memory tool units (2), said memory tool (2) arranged for transmitting a part (11*s*) of said high data volume data (11) via said databus (7) online to said server toolbus controller (62) during logging, and said memory tool (2) controlled by a uplink capacity indicator device (71) in said surface read-out unit (SRO) or toolbus server controller (62) arranged for negotiating transmission for uploading more parts (11*s*) of or all of said high data volume (11) via said server toolbus controller (62) to said surface telemetry unit (106) and said surface read-out unit (SRO) if said uplink capacity indicator device (71) indicates available uplink capacity.

14. The memory tool unit (2) of claim 13, said high data volume producing logging tool (1) comprising an ultrasound probe array producing a high volume of processed data (11).

15. The memory tool unit (2) of claim 13, said high data volume producing logging tool (1) comprising a high-resolution camera.

16. A petroleum well downhole logging method comprising the steps of:

running a logging toolstring (0) on a wireline (8) in a petroleum well and communicating with a server toolbus controller (62) in said logging toolstring (0) at a first bitrate (r1) of 250 kB/s or more from a surface read-out unit (SRO) with a memory (123), said server toolbus controller (62) controlling acquisition and uplink transmission of first volume sensor data (41*a*, 41*b*, 41*c*, ... ) from one or more logging tools (4) connected on a toolstring databus (7) operating at a second bitrate (r2) of between 500 kB/s and 2 MB/s, higher than or equal to said first bitrate (r1), on said server toolbus controller (62), wherein said server toolbus controller (62) further controlling acquisition of data (11) from one or more high data volume producing tool (1), which is different from the one or more logging tools (4) and also connected on said databus (7), and controlling uplink transmission of parts (11*s*) of said high-volume data (11), sending said high-volume data (11) on a local high-speed data bus (3) of a corresponding memory tool unit (2) operating at a third bitrate (r3) of 100 MB/s, higher than said second bitrate (r2), from said high data volume producing tool (1) to the corresponding memory tool (2), the corresponding memory tool being different from the one or more logging tools (4) and the one or more high data volume producing tool (1), including a memory section (21) and said local high-speed data bus (3) operating at the third bitrate (r3) of 100 MB/s being higher than said second bitrate (r2), and also connected on said databus (7), and while an uplink capacity indicator (71) for said communication on said wireline (8) is positive, uploading more parts (11*s*) from said memory tool (2) via said toolbus (7) to said surface read-out unit (SRO) with said memory (123).

17. The petroleum well downhole logging method of claim 16, updating an inventory (24) keeping track of which parts (11*s*) of the high-volume data (11) are confirmed sent to the surface read-out unit (SRO), and which other parts (11*s*) that are kept in said memory section (21) as a buffer.

18. The petroleum well downhole logging method of claim 16, transmitting parts (11*s*) of said high-volume data (11) such as low-resolution image extracts (11*e*) of said high-volume data (11) to said surface read-out (SRO).

19. The petroleum well downhole logging method of claim 16, keeping and updating in said surface read-out (SRO) an inventory (124) for which parts (11*s*) of said high-volume data (11) are received in said surface-read-out (SRO), and which other part of high-volume data (11) remaining in said downhole memory section (21).

20. The petroleum well downhole logging method of claim 16, said high data volume producing logging tool (1) comprising a high-resolution multi-sensor ultrasound unit (14).

21. The petroleum well downhole logging method of claim 16, said high data volume producing logging tool (1) comprising a high-resolution camera (14).

22. The petroleum well downhole logging method of claim 16, operating one or more second high data volume producing tools (1) each with a corresponding second memory tool (2) in the same logging toolstring (0), running said second high data volume producing tools (1) with said second memory tool (2) in memory mode storing second high volume data (11), while said first high data volume producing tools (1) and said first memory tool (1) are operated uploading parts (11*s*) of said first high volume data (11).

* * * * *